United States Patent [19]

Hattori

[11] Patent Number: 4,881,925
[45] Date of Patent: Nov. 21, 1989

[54] BELT TYPE CONTINUOUSLY VARIABLE TRANSMISSION FOR VEHICLE

[75] Inventor: Torao Hattori, Saitama, Japan

[73] Assignee: Honda Giken Kogyo Kabushiki Kaisha, Tokyo, Japan

[21] Appl. No.: 185,512

[22] Filed: Apr. 25, 1988

[30] Foreign Application Priority Data

Apr. 24, 1987 [JP] Japan ................. 62-100105
Apr. 24, 1987 [JP] Japan ................. 62-100106
Apr. 24, 1987 [JP] Japan ................. 62-100107

[51] Int. Cl.⁴ .......................... F16H 11/02
[52] U.S. Cl. ...................... 474/18; 74/865; 474/28
[58] Field of Search ............ 474/11, 12, 17, 18, 474/28, 69, 70; 74/865-14 869

[56] References Cited

U.S. PATENT DOCUMENTS

| 3,720,113 | 3/1973 | Doorne et al. | 474/242 X |
| 4,519,790 | 5/1985 | Yamamuro et al. | 474/18 |
| 4,522,086 | 6/1985 | Haley | 74/867 |
| 4,526,561 | 7/1985 | Hattori | 474/242 |
| 4,533,340 | 8/1985 | Abo et al. | 474/28 |
| 4,552,548 | 11/1985 | Hattori | 474/201 |
| 4,560,369 | 12/1985 | Hattori | 474/28 |
| 4,619,157 | 10/1986 | Sakai | 474/28 X |
| 4,672,864 | 6/1987 | Morimoto | 474/28 X |
| 4,764,156 | 8/1988 | Ohkumo | 474/28 |

Primary Examiner—Thuy M. Bui
Attorney, Agent, or Firm—Lyon & Lyon

[57] ABSTRACT

A hydraulic pressure controller is provided between a hydraulic actuator for changing the effective radii of a drive V-pulley mounted on an input shaft and a driven V-pulley mounted on an output shaft and a hydraulic pump is provided for supplying hydraulic pressure to the hydraulic actuator. The hydraulic pressure controller is controlled by an input torque sensor and a speed change ratio sensor, whereby the hydraulic pressure supplied to the hydraulic actuator is automatically controlled in proportion to the input torque received by the input shaft and the speed change ratio between the input and output shafts.

17 Claims, 7 Drawing Sheets

BELT TYPE CONTINUOUSLY VARIABLE TRANSMISSION FOR VEHICLE

BACKGROUND OF THE INVENTION

1. FIELD OF THE INVENTION

The present invention relates to a belt type continuously variable transmission incorporated in a power transmitting system of a vehicle such as motorcycles and automobiles, and particularly, a belt type continuously variable transmission comprising an input shaft driven from an engine, an output shaft for driving a wheel, a drive V-pulley mounted on the input shaft and variable in effective radius, a driven V-pulley mounted on the output shaft and variable in effective radius, a V-belt stretched around the both pulleys, a hydraulic actuator for changing the effective radius of each of the V-pulleys, and a hydraulic pressure controller for controlling the hydraulic pressure supplied to the hydraulic actuator, the controller being provided between the hydraulic actuator and a hydraulic pump driven by the engine to supply a hydraulic pressure to the hydraulic actuator.

2. DESCRIPTION OF THE PRIOR ART

In such belt type continuously variable transmission, a high hydraulic pressure constantly applied to the hydraulic actuator results not only in an increased burden on the hydraulic pump to bring about a loss of power of the engine, but also in an excessive tension applied to the V-belt to reduce the life thereof.

SUMMARY OF THE INVENTION

It is therefore an object of the present invention to provide a belt type continuously variable transmission for vehicles wherein the actuating hydraulic pressure of the hydraulic actuator can be automatically controlled according to a loading condition for a V-belt to diminish the loss of power of an engine and to maintain a high efficiency of transmission while ensuring the durability of the V-belt.

According to the present invention, the above object is accomplished by providing a belt type continuously variable transmission comprising an input shaft driven from an engine, an output shaft for driving a wheel, a drive V-pulley mounted on the input shaft and variable in effective radius, a driven V-pulley mounted on the output shaft and variable in effective radius, a V-belt stretched around the both pulleys, a hydraulic actuator for changing the effective radius of each of the V-pulleys, and a hydraulic pressure controller for controlling the hydraulic pressure supplied to the hydraulic actuator, the controller being provided between the hydraulic actuator and a hydraulic pump driven by the engine to supply a hydraulic pressure to the hydraulic actuator, wherein the transmission includes an input torque sensor for controlling the hydraulic pressure controller so that the hydraulic pressure supplied to the hydraulic actuator is proportional to the input torque of the input shaft, and a speed change ratio sensor for controlling the hydraulic pressure controller so that the hydraulic pressure supplied to the hydraulic actuator is proportional to the speed change ratio between the input and output shafts, the sensors being connected to the hydraulic pressure controller.

With the above construction, the hydraulic pressure of the hydraulic actuator can be controlled in proportion to the input torque and the speed change ratio and consequently, it is possible to reduce the burden on the hydraulic pump to a necessary limit to diminish the loss of power of the engine, and to apply a tension according to a load to the V-belt to provide an improvement of life thereof and efficiency of transmission.

The above and other objects, features and advantages of the present invention will become apparent from reading of the following detailed description of the preferred embodiment, taken in conjunction with the accompanying drawings.

DESCRIPTION OF THE PREFERRED EMBODIMENTS

The present invention will now be described by way of an embodiment thereof with reference to the accompanying drawings.

Figure 1:
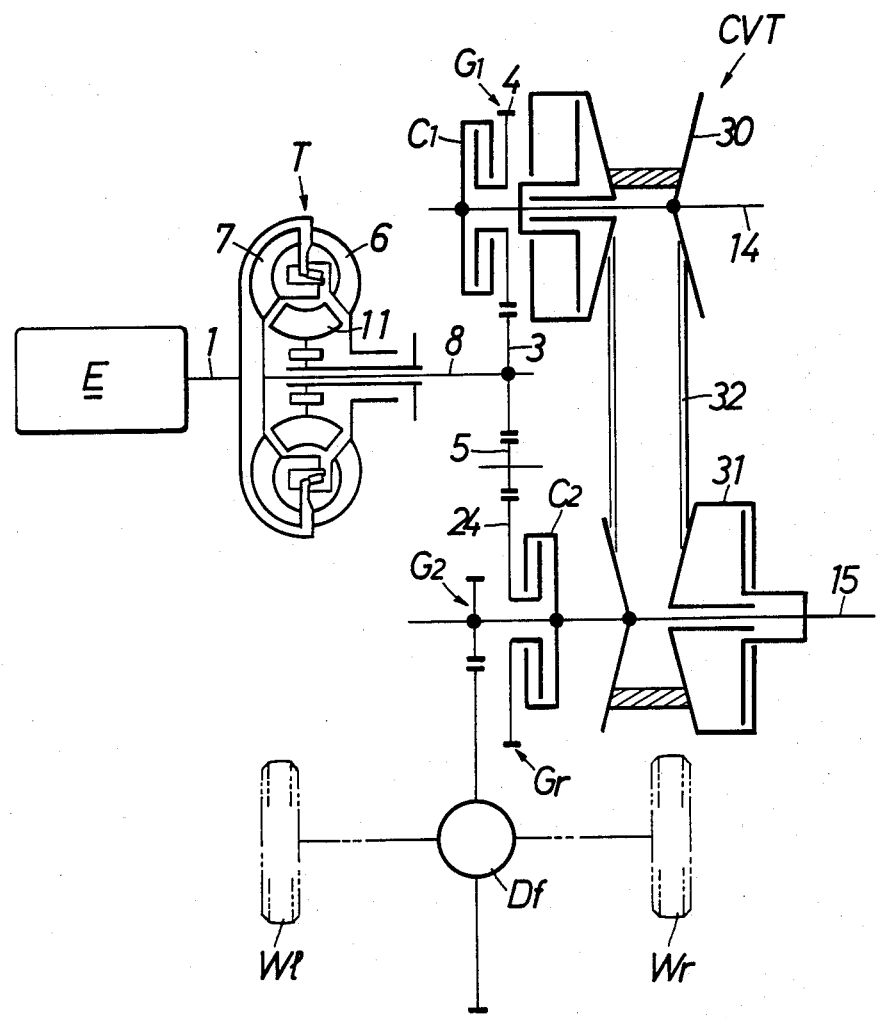
FIG. 1 is a schematic diagram of a power transmitting system of an automobile.
Figure 2:
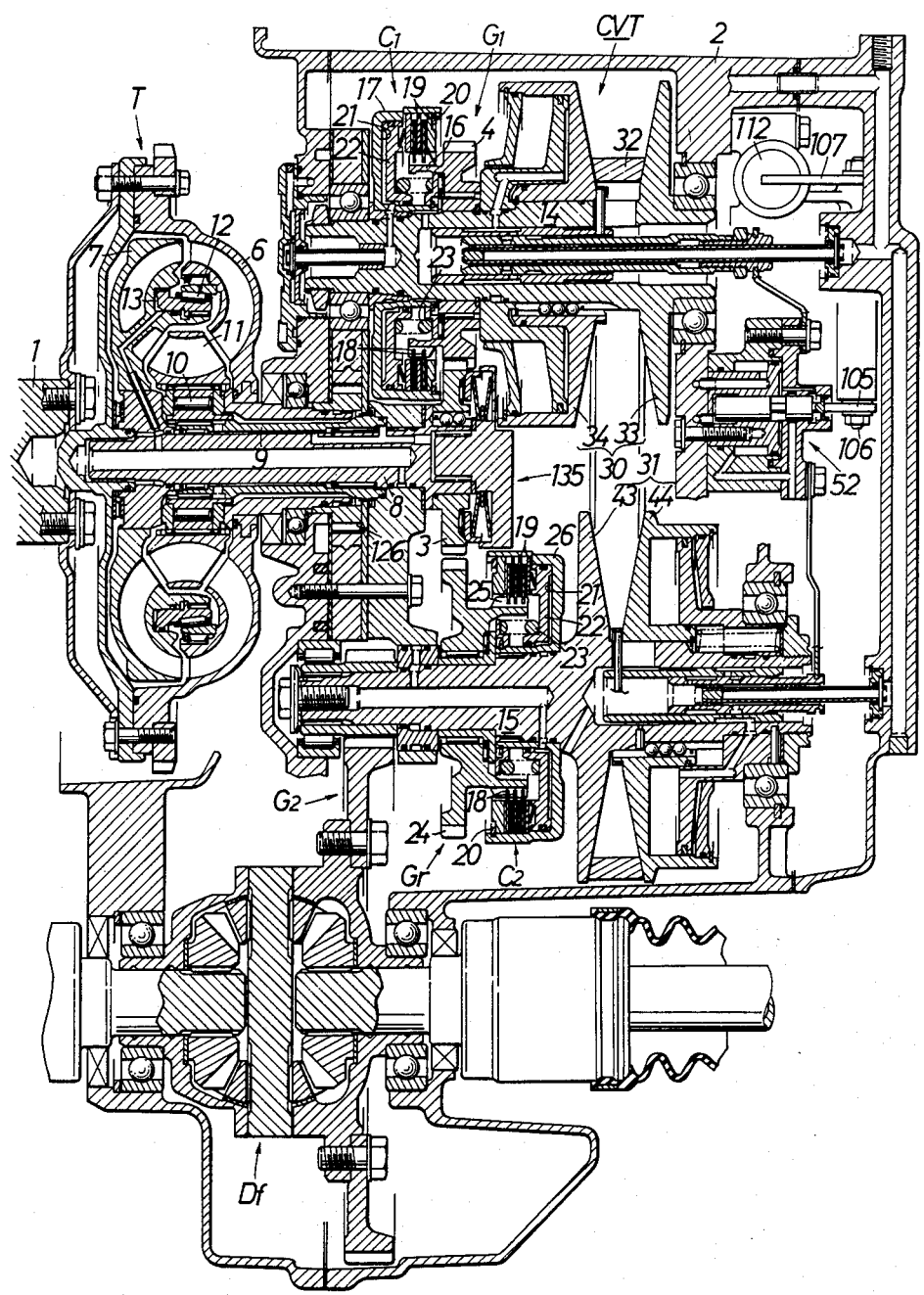
FIG. 2 is a longitudinal sectional view illustrating, in detail, a section from a torque converter to a differential gear in the power transmitting system.

Referring first to FIGS. 1 and 2, connected to a crankshaft 1 of an engine E are a torque converter T, a primary reduction gear train G1, a first clutch C1, a belt-type continuously variable transmission CVT, a secondary reduction gear train G2 and a differential gear Df. A reverse gear train Gr and a second clutch C2 are interposed in parallel to the first clutch C1 and the continuously variable transmission CVT between the torque converter T and the secondary reduction gear train G2 and are accommodated in a transmission case 2 connected to a crankcase of the engine E.

The primary reduction gear train G1 and the reverse gear train Gr have a drive gear 3 in common, and the reverse gear train Gr has an idle gear 5 in the middle.

Left and right driving wheels Wl and Wr of an automobile are connected to a pair of output shafts of the differential gear Df.

If the second clutch C2 is turned off and the first clutch C1 is turned on the power from the engine E can be transmitted successively through the torque converter T, the primary reduction gear train G1, the first clutch C1, the continuously variable transmission CVT, the secondary reduction gear train G2 and the differential gear Df to the driving wheels $W_l$ and Wr to drive these wheels in a forward direction. On the other hand, if the first clutch C1 is turned off and the second clutch C2 is turned on, the power from the engine E can be transmitted successively through the torque converter T, the reverse gear train Gr, the secondary reduction gear train G2 and the differential gear Df to the driving wheels $W_l$ and Wr to drive them in a backward direction.

As clearly shown in FIG. 2, the torque converter T is comprised of a pump impeller 6 connected to the crankshaft 1, a turbine impeller 7 connected to a turbine shaft 8, a stator impeller 11 connected through a unidirectional clutch 10 to a stationary stator shaft 9 relatively rotatably carried on the turbine shaft 8. The torque transmitted from the crankshaft 1 to the pump impeller 6 is hydraulically transmitted to the turbine impeller 7, and if amplification of the torque is effected during this time, the stator impeller 11 bears a reaction force thereof as known.

A known roller type lockup clutch 12 is provided between the pump impeller 6 and the turbine impeller 7. The lockup clutch 12 has a hydraulic oil chamber 13 defined in the turbine impeller 7, so that if a hydraulic pressure higher than the internal pressure of the torque converter T is introduced into the hydraulic oil chamber 13, the impellers 6 and 7 can be mechanically coupled to each other with a coupling force according to such hydraulic pressure.

The drive gear 3 of the primary reduction gear train G1 is coupled to the turbine shaft 8, and a driven gear 4 of the primary reduction gear train G1 is rotatably carried on an input shaft 14 of the continuously variable transmission CVT.

The first clutch C1 comprises an inner member 16 formed integrally with the driven gear 4, and an outer member 17 spline-connected to the input shaft 14 to surround the inner member 16. A plurality of driving friction plates 18 and a plurality of driven friction plates 19 are interposed in an alternately superposed manner between the inner and outer members 16 and 17, the driving friction plates 18 being slidably spline-fitted on the inner member 16 and the driven friction plates 19 being slidably spline-fitted on the outer member 17, and a pressure-receiving ring 20 for restraining the outward movement of the outermost driven friction plate 19 is locked on the outer member 17. A hydraulic cylinder 21 is defined in the outer member 17 on the opposite side from the pressure receiver ring 21 and has a piston 22 slidably received therein and opposed to the innermost driven friction plate 19 with a buffer spring sandwiched therebetween. The piston 22 is resiliently biased in a retreated direction, i.e., away from the friction plates 18 and 19 by a return spring 23 disposed inside the inner member 16.

If a hydraulic pressure is supplied into the hydraulic cylinder 21, the piston 22 is advanced under such hydraulic pressure to provide the friction engagement between the friction plates 18 and 19, so that the first clutch C1 is turned on. This makes it possible to transmit a rotational torque of the primary reduction gear train G1 to the input shaft 14. On the other hand, if the hydraulic pressure in the hydraulic cylinder 21 is released, the piston 22 is retreated by a resilient force of the return spring 23, so that the friction engagement between the friction plates 18 and 19 is released and thus, the first clutch C1 is turned off to discontinue the transmission of a power to the input shaft 14.

The second clutch C2 comprises an inner member 25 rotatably carried on an output shaft 15 of the continuously variable transmission CVT and integrally with a driven gear 24 of the reverse gear train Gr, and an outer member 26 spline-connected to the output shaft 15 to surround the inner member 25. The mechanism provided between the inner and outer members 25 and 26 are similar to that of the above-described first clutch C1 and hence, individual portions of the mechanism are indicated by the same numerals affixed in Figures as in the first clutch C1 and the description thereof is omitted.

The second clutch C2 is turned on and off by supplying and discharging of a hydraulic pressure to and from the hydraulic cylinder 21 and in its on-state, it permits the rotational torque of the reverse gear train Gr to be transmitted to the output shaft 15, while in its off-state, it discontinues the transmission of the power.

The continuously variable transmission CVT includes, as predominant elements, a drive V-pulley 30 disposed adjacent the right side of the first clutch C1, a driven or follower V-pulley 31 disposed adjacent the right side of the second clutch C2, and a V-belt 32 stretched around the V-pulleys 30 and 31.

The above elements will be described in detail with reference to FIG. 3. The drive V-pulley 30 is comprised of a stationary pulley half 33 fixedly mounted on the input shaft 14, and a movable pulley half 34 slidably connected to the input shaft 14 with ball keys 35 interposed therebetween. The movable pulley half 34 has a hydraulic cylinder 36 integrally provided on the back thereof, and a stationary piston 38 is received in the hydraulic cylinder 36 and carried on the input shaft 14 against axial movement to define a hydraulic chamber 37. Thus, if a hydraulic pressure is introduced into the hydraulic chamber 37, the hydraulic cylinder 36 and thus the movable pulley half 34 can be moved rightward under the hydraulic pressure toward the stationary pulley half 33 to increase the effective radius of the drive V-pulley 30, i.e., radius of contact with the V-belt 32. On the other hand, if the hydraulic pressure in the hydraulic chamber 37 is released, the movable pulley half 34 can be moved leftward away from the stationary pulley half 33 by tension of the V-belt 32 to decrease the effective radius of the drive V-pulley 30. For such operation of the movable pulley half 34 by the hydraulic pressure, a first control valve $39_1$ is provided within the input shaft 14 and the detail thereof will be described hereinafter.

An end plate 40 is secured to an opened end of the hydraulic cylinder 36 and slidably supported around an outer periphery of a boss portion 38a of the stationary piston 38, thereby providing a stability of support of the movable pulley half 34. A bleed groove 41 is cut in a slide surface of the end plate 40 against the boss portion 38a to permit communication between the interior and exterior of the end plate 40.

The follower or driven V-pulley 31 is comprised of a stationary pulley half 43 integrally formed on the output shaft 15, and a movable pulley half 44 slidably connected to the output shaft 15 with ball keys 45 interposed therebetween. The stationary pulley half 43 is disposed in a relation of point symmetry with the stationary pulley half 33 of the drive V-pulley 30, while the movable pulley half 44 is disposed in a relation of point symmetry with the movable pulley half 34. The movable pulley half 44 includes a hydraulic cylinder 46 integrally provided on the back thereof, and a stationary piston 48 secured to the output shaft 15 is received in the hydraulic cylinder 46 to define a hydraulic chamber 47. A spring 49 is mounted in a compressed manner between the output shaft 15 and the movable pulley half 44 for resiliently biasing this half 44 toward the stationary pulley half 43, so that a resilient force of the spring 49 imparts an initial tension to the V-belt 32.

Thus, if a hydraulic pressure is introduced into the hydraulic chamber 47, the hydraulic cylinder 46 and thus the movable pulley half 44 can be moved leftward toward the stationary pulley half 43 under such hydraulic pressure to increase the effective radius of the driven V-pulley 31. On the other hand, if the hydraulic pressure within the hydraulic chamber 47 is released, the movable pulley half 44 can be moved rightward away from the stationary pulley half 43 by tension of the V-belt 32 to decrease the effective radius of the driven V-pulley 31. For such operation of the movable pulley half 44 by the hydraulic pressure, a second control valve $39_2$ is provided within the output shaft 15 and the detail thereof will be described hereinafter.

An end plate 50 is secured to an opened end of the hydraulic cylinder 46 and slidably supported around an outer periphery of a boss portion 48a of the stationary piston 48, thereby providing a stability of support of the movable pulley half 44. A bleed groove 51 is cut in a slide surface of the end plate 50 against the boss portion 48a to permit communication between the interior and exterior of the end plate 50.

Now, the first and second control valves $39_1$ and $39_2$ and a hydraulic servo motor 52 for driving them will be described with reference to FIG. 3.

The first control valve $39_1$ comprises a cylindrical follower valve spool 56 slidably fitted in a hollow portion of the input shaft 14, and a cylindrical main valve spool 55 slidably fitted in the follower valve spool 56. A hydraulic oil inlet pipe 57 is inserted in the main valve spool 55. The hydraulic oil inlet pipe 57 is fixed at its base end to the transmission case 2. A cylindrical oil passage 58 is defined between the main valve spool 55 and the hydraulic oil inlet pipe 57 to communicate with the interior of the hydraulic oil inlet pipe 57.

The main valve spool 55 includes, around its outer periphery, an annular oil feed groove 59 and an annular oil discharge groove 60 located at a place apart from the oil feed groove 59 toward the stationary pulley half 33. The oil feed groove 59 communicates with the cylindrical oil passage 58 by way of a through hole 61, while the oil discharge groove 60 is opened to the exterior of the main valve spool 55 through an axial groove 62.

On the other hand, the follower valve spool 56 includes an annular oil passage 63 opened to its outer peripheral surface, and a control port 64 adapted to permit the alternate communication of the annular oil passage 63 with the oil feed groove 59 and the oil discharge groove 60. The annular oil passage 63 is connected to the hydraulic chamber 37 via a through hole 65. Further, the follower valve spool 56 is connected to the movable pulley half 34 through a connecting pin 67 penetrating an elongated hole 66 long in an axial direction of the input shaft 14 for axial reciprocation with the movable pulley half 34.

Figure 3:
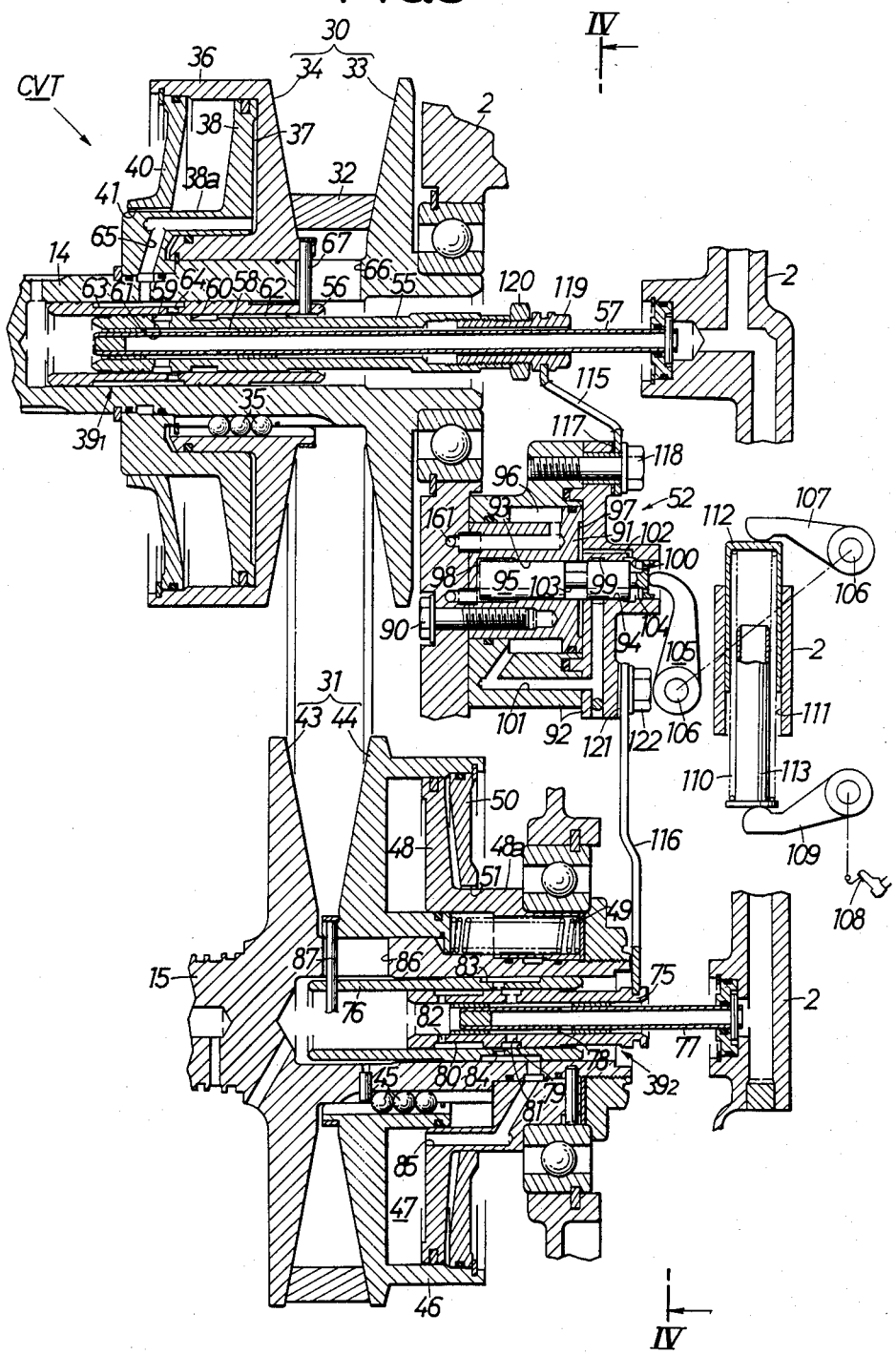
FIG. 3 is an enlarged view in longitudinal section of a belt type continuously variable transmission in the power transmitting system.

Thus, if the main valve spool 55 is moved rightward as viewed in FIG. 3, the oil feed groove 59 is brought into communication with the control port 64, so that a hydraulic oil pressure is supplied through the hydraulic oil inlet pipe 57 to the hydraulic chamber 37, and the movable pulley half 34 is moved rightward with the follower valve spool 56 under such hydraulic pressure. This rightward movement of the follower valve spool 56 causes the control port 64 to be closed by the main valve spool 55 and if so, supplying of the hydraulic pressure into the hydraulic chamber 37 is cut off and thus, the rightward movement of the movable pulley half 34 is stopped. To the contrary, if the main valve spool 55 is moved leftward, the oil discharge groove 60 is brought into communication with the control port 64, so that the hydraulic pressure in the hydraulic chamber 37 is released through the axial groove 62 to permit the leftward movement of the movable pulley half 34. Then, if the movable pulley half 34 is moved leftward, the valve spool 56 is also moved leftward together with the movable pulley half 34. When the control port 64 is thus closed by the main valve spool 55, discharging of oil from the hydraulic oil chamber 37 is blocked to stop the leftward movement of the movable pulley half 34. In this way, the movable pulley half 34 is operated to move with the follower valve spool 56 in a manner to follow the movement of the main valve spool 55.

The second control valve $39_2$ comprises a cylindrical follower valve spool 76 slidably fitted in a hollow portion of the output shaft 15, and a cylindrical main valve spool 75 slidably fitted in the follower valve spool 76. A hydraulic oil inlet pipe 77 is inserted in the main valve spool 75. The hydraulic oil inlet pipe 77 is fixed at its base end to the transmission case 2. A cylindrical oil passage 78 is defined between the main valve spool 75 and the hydraulic oil inlet pipe 77 to communicate with the interior of the hydraulic oil inlet pipe 77.

The main valve spool 75 includes, around its outer periphery, an annular oil feed groove 79 and an annular oil discharge groove 80 located at a place apart from the oil feed groove 79 toward the stationary pulley half 43. The oil feed groove 79 communicates with the cylindrical oil passage 78 by way of a through hole 81, while the oil discharge groove 80 is opened to the exterior of the main valve spool 75 through a discharge hole 82.

On the other hand, the follower valve spool 76 includes an annular oil passage 83 opened to its outer peripheral surface, and a control port 84 adapted to permit the alternate communication of the annular oil passage 83 with the oil feed groove 79 and the oil discharge groove 80. The annular oil passage 83 is connected to the hydraulic oil chamber 47 via a through hole 65. Further, the follower valve spool 76 is connected to the movable pulley half 44 through a connecting pin 87 penetrating an elongated hole 86 long in an axial direction of the output shaft 15 for axial reciprocation with the movable pulley half 44.

Thus, if the main valve spool 75 is moved rightward as viewed in FIG. 3, the oil discharge groove 80 is brought into communication with the control port 84, so that a hydraulic oil pressure in the hydraulic oil chamber 47 is released through the discharge hole 82 to permit the rightward movement of the movable pulley half 44. Then, if the movable pulley half 44 is moved rightward, the follower valve spool 76 is also moved rightward and with this movement, the control port 84 is closed by the main valve spool 75. This causes discharging of the oil from the hydraulic oil chamber 47 to be discontinued, thus stopping the rightward movement of the movable pulley half 44. To the contrary, if the main valve spool 75 is moved leftward, the oil feed groove 79 is brought into communication with the control port 84, permitting a hydraulic pressure to be supplied into the hydraulic oil chamber 47, so that the movable pulley half 44 is moved leftward with the follower valve spool 76 under such hydraulic pressure. This causes the control port 84 to be closed by the main valve spool 75, cutting off the supplying of the hydraulic pressure into the hydraulic oil chamber 47 to stop the leftward movement of the movable pulley half 44. In this way, the movable pulley half 44 is operated to move with the follower valve spool 76 in a manner to follow the movement of the main valve spool 75.

The servo motor 52 comprises a piston 91 disposed in parallel to the input and output shafts 14 and 15 and secured to the transmission case 2 by a bolt 90, a power cylinder 92 slidably supported on the piston 91, and a pilot valve 95 slidably fitted in valve bores 93 and 94 which are made in central portions of the piston 91 and the power cylinder 92, respectively.

The interior of the power cylinder 92 is divided by the piston 91 into a lefthand first actuating chamber 96 and a righthand second actuating chamber 97, with a pressure receiving area of the second actuating chamber 97 being set larger than that of the first actuating chamber 96. The first actuating chamber 96 communicates with an output oil passage 161 which will be described hereinafter, while the second actuating chamber 97 is connected to both the valve bores 93 and 94. A hydraulic control oil chamber 98 is defined in the valve bore 93 by a left end face of the pilot valve 95, so that a hydraulic oil pressure proportional to vehicle speed may be supplied to the hydraulic control oil chamber 98 from a vehicle speed responsive type hydraulic governor 163 which will be described hereinafter.

An inner wall of the valve bore 94 in the power cylinder 92 is provided with an annular oil feed groove 99 and an annular oil discharge groove 100 occupying a position righthand therefrom. The oil feed groove 99 communicates with the first actuating chamber 96 via a through hole 101, while the oil discharge groove 100 communicates with the second actuating chamber 97 via a through hole 102.

The pilot valve 95 includes, around its outer periphery, a first annular control groove 103 adapted to provide the connection and disconnection between the second actuating chamber 97 and the oil feed groove 99, and a second annular control groove 104 adapted to open and close the oil discharge groove 100. The second control groove 103 is opened to the outside of the pilot valve 95.

A swinging end of a control lever 105 bears against a right end face of the pilot valve 95 to urge it toward the hydraulic control oil chamber 98. The control lever 105 is connected to a pressure receiving lever 107 through a pivot 106 (see FIG. 2) supported on the transmission case 2, and a coil spring 110 is interposed between the pressure receiving lever 107 and a pressing lever 109 operatively connected to an accelerator pedal 108 which is operated to open and close a throttle valve (not shown) of the engine E, so that the compression load of the coil spring 110 may be increased in proportion to the depression of the pedal 108, i.e., an increase in opening degree of the throttle valve.

The coil spring 110 is connected at its one end to a leading end of the pressure receiving lever 107 through an outer tube 112 slidable in a guide hole 111 of the transmission case 2 and at the other end to the pressing lever 109 through an inner tube 113 slidable within the outer tube 112, and the outer tube 112 and inner tube 113 prevent the coil spring 110 from buckling.

In this manner, a rightward control force proportional to the vehicle speed is applied to the pilot valve 95 from the hydraulic control oil chamber 98, and a leftward control force porportional to the opening degree of the throttle valve of the engine E is applied to the pilot valve 95 from the control lever 105 so that the pilot valve 95 may be operated leftward or rightward depending upon the superiority and inferiority between these control forces.

Thus, if the pilot valve 95 is moved rightward, the oil discharge groove 100 is closed, and the second actuating chamber 97 and the oil feed groove 99 are brought into communication with each other, so that a hydraulic pressure is also supplied into the second actuating chamber 97 as is into the first actuating chamber 96, whereby the power cylinder 92 is moved rightward with a force provided by multiplication of a difference between the pressure receiving areas of the actuating chambers 96 and 97 by such hydraulic pressure. With the oil discharge groove 100 closed, if the oil feed groove 99 is also closed with this rightward movement, supplying of the hydraulic pressure into the second actuating chamber 97 is cut off to stop the rightward movement of the power cylinder 92. Then, if the pilot valve 95 is moved leftward, the oil discharge groove 100 is opened to permit the hydraulic pressure in the second actuating chamber 97 to be released through the second control groove 104, so that the power cylinder 92 is moved leftward by the hydraulic pressure in the first actuating chamber 96 and with this leftward movement, the oil discharge groove 100 is closed to stop the leftward movement of the power cylinder 92. In this way, the power cylinder 92 is power-operated in a manner to follow the leftward and rightward movement of the pilot valve 95.

The main valve spools 55 and 75 of the first and second control valve $39_1$ and $39_2$ are connected to the power cylinder 92 through the first and second interlocking plates 115 and 116 (see FIG. 4), respectively. More specifically, the first interlocking plate 115 is connected at its one end to the right end face of the power cylinder 92 by a bolt 118 with a shim 117 sandwiched therebetween, and at the other end thereof to an adjusting bolt 119 threadedly connected to an outer end of the main valve spool 55. The adjusting position of the adjusting bolt 119 is fixed by a lock nut 120. On the other hand, the second interlocking plate 116 is connected at its one end to the right end face of the power cylinder 92 by a bolt 122 with a shim 121 sandwiched therebetween, and at the other end thereof to the outer end of the main valve spool 75.

Accordingly, the operation of the power cylinder 92 makes it possible to simultaneously drive both main valve spools 55 and 75 through the interlocking plates 115 and 116.

In this case, the relative position of both main valve spools 55 and 75, namely, the timing for opening and closing the respective control ports 64 and 84 in the control valves $39_1$ and $39_2$ is established in the following manner by selection of a width of the shims 117 and 121 and by adjustment of the threadedly connected position of the adjusting bolt 119.

(a) In the rightward movement of the power cylinder 92, the control port 84 in the second control valve $39_2$ is first closed, while the control port 64 in the first control valve $39_1$ is put into communication with the oil feed groove 59. Then, in a condition with the control port 64 and the oil feed groove 59 in communication with each other, the control port 84 in the second control valve $39_2$ is brought into communication with the oil discharge groove 80.

By doing so, a tension can be applied to the V-belt 32 at the initial stage of the rightward movement of the power cylinder 92 by a rightward moving force of the movable pulley half 34 provided by the hydraulic pressure supplied through the oil feed groove 59 into the hydraulic oil chamber 37 in the drive V-pulley 30.

Then, both pulley halves 34 and 44 can be moved rightward while maintaining such tension, as the oil is forced out of the hydraulic oil chamber 47 in the driven V-pulley 31 into the oil discharge groove 80.

(b) In the leftward movement of the power cylinder 92, the control port 84 in the second control valve $39_2$ is first closed and then, the control port 64 in the first control valve $39_1$ is closed, while the control port 84 in the second control valve $39_2$ is put into communication with the oil feed groove 79. Thereafter, in a condition with the control port 84 and the oil feed groove 79 in communication with each other, the control port 64 in the first control valve $39_1$ is brought into communication with the oil discharge groove 60.

By doing so, a tension can be applied to the V-belt 32 during leftward movement of the power cylinder 92 by a leftward moving force of the movable pulley half 44 provided by the hydraulic pressure supplied through the oil feed groove 79 into the hydraulic oil chamber 47 in the driven V-pulley 31. Then, both pulley halves 34 and 44 can be moved leftward while maintaing such tension, as the oil is forced out of the hydraulic oil chamber 37 in the drive V-pulley 30 into the oil discharge groove 60.

With the rightward control force larger than the leftward control force to the pilot valve 95, the latter is moved rightward to move the power cylinder 92, thereby operating the first and second control valves $39_1$ and $39_2$ to move both movable pulley halves 34 and 44 rightward, thus decreasing a speed change ratio (reduction ratio) between the V-pulleys 30 and 31. On the other hand, with the leftward control force larger than the rightward control force, the pilot valve 95 is moved leftward to move the power cylinder 92 leftward, thereby operating both control valves $39_1$ and $39_2$ to move the movable pulley halves 34 and 44 leftward, thus increasing the speed change ratio.

Figure 5:
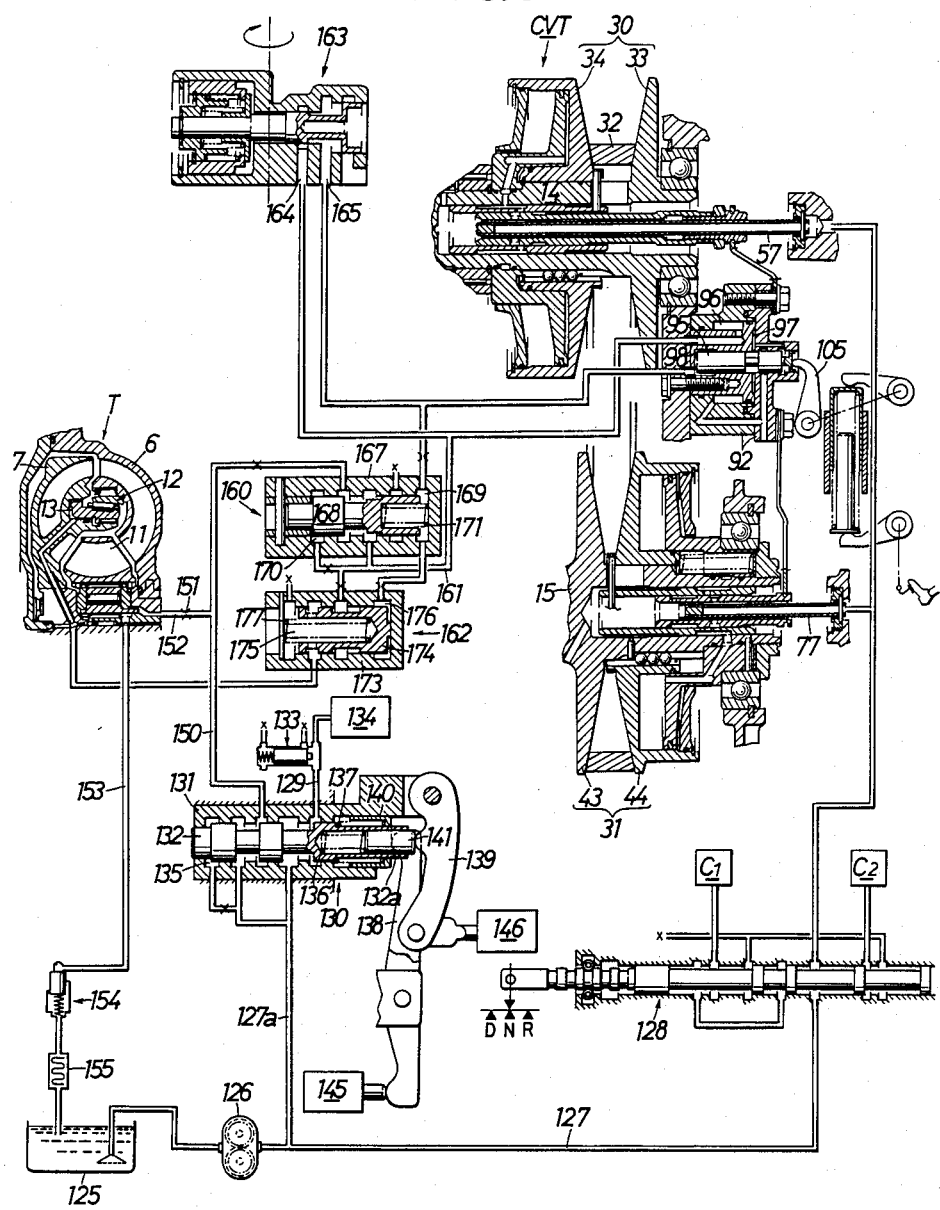
FIG. 5 is a diagram of a hydraulic circuit for the torque converter and the continuously variable transmission.

With reference to FIG. 5, description will now be made of a hydraulic circuit for supplying a hydraulic pressure to the above-described various hydraulically-operated portions.

A hydraulic pump 126 for drawing up an oil from an oil reservoir 125 formed at the bottom of the transmission case 2 is driven by the pump impeller 6 of the torque converter T (see FIG. 1). A working oil passage 127 extending from a discharge port of the hydraulic pump 126 is connected through a manual valve 128 to the first and second clutches C1 and C2 as well as to the hydraulic oil inlet pipes 57 and 77.

The manual valve 128 is operared to the neutral position N, a drive position D and a reverse position R by a driver or operator. When the manual valve 128 is in the neutral position N, supplying of an oil through the working oil passage to the first and second clutches C1 and C2 is cut off, and the hydraulic cylinders 21 thereof are opened to the oil reservoir 125 (a mark X in Figure represents that they lead to the oil reservoir 125), while the oil is supplied through the working oil passage 127 to the hydraulic oil inlet pipes 57 and 77. When the manual valve 128 is in the drive position D, the oil is supplied to the first clutch C1 and both the hydraulic oil inlet pipes 57 and 77, but the supply of the oil to the second clutch C2 still remains cut off. When the manual valve 128 is in the reverse position R, supplying of the oil to the first clutch C1 is cut off, while the oil is supplied to the second clutch C2 and both the hydraulic oil inlet pipes 57 and 77.

For the purpose of controlling the hydraulic pressure (which will be referred to as a line pressure hereinafter) in the working oil passage 127, a hydraulic pressure controller, i.e., a regulator valve 130 is interposed between a branched oil passage 127a of the working oil passage 127 and a spill oil passage 129.

The regulator valve 130 comprises a valve box 131 fixedly mounted on the transmission case 2, and a valve spool 132 slidable within the valve box 131, so that if the valve spool 132 is moved rightward as viewed in FIG. 5, the branched oil passage 127a may be put into communication with the spill oil passage 129 to reduce the line pressure, whereas if the valve spool 132 is moved leftward, both the oil passages 127a and 129 may be put out of communication with each other to increase the line pressure. The oil overflowing into the spill oil passage 129 is supplied through a relief valve 133 to the various portions 134 to be lubricated.

A pressure receiving chamber 135, which is faced by a left end of the valve spool 132, is provided within the valve box 131 and communicates with the branched oil passage 127a.

Figure 6:
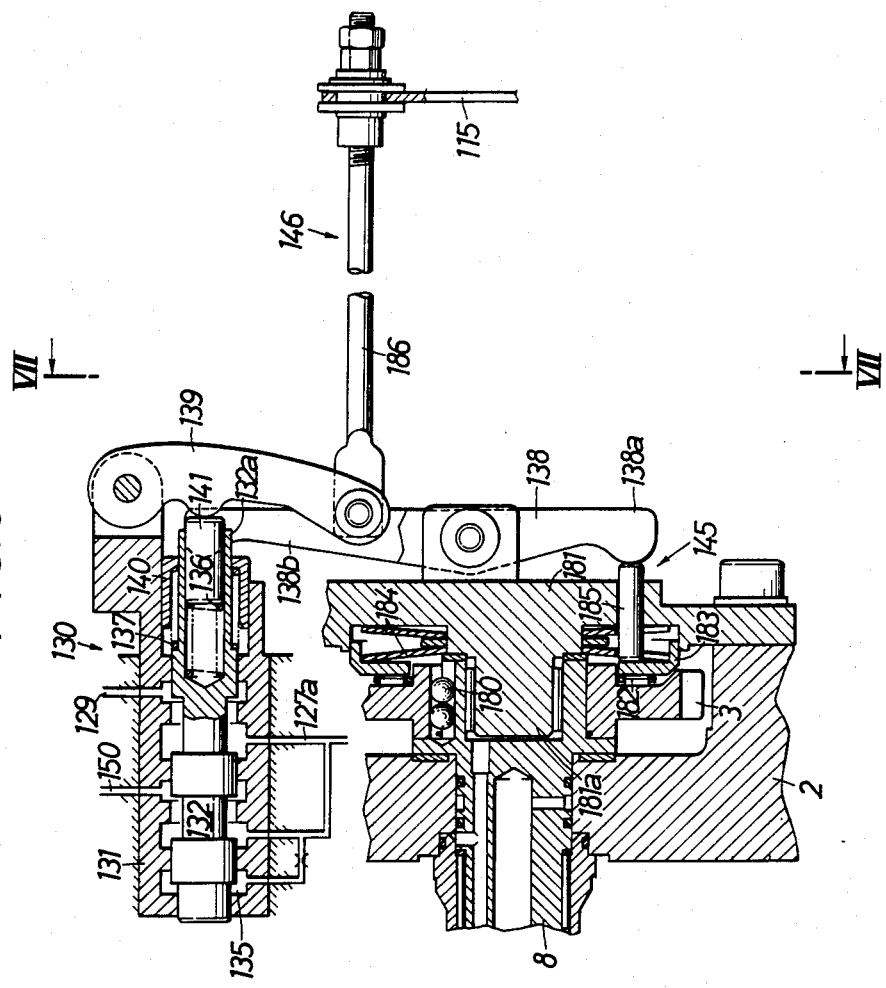
FIG. 6 is a longitudinal sectional view of a hydraulic pressure controller in the hydraulic circuit.

On the other hand, first and second control levers 138 and 139 are mounted on a right end of the valve spool 132 with first and second pressure-control springs 137 and 136 interposed therebetween respectively to urge the valve spool 132 leftward (see FIG. 6). The levers 138 and 139 are pinned to the transmission case. The first pressure-control spring 137 is disposed to surround a cylindrical portion 132a formed at the right end of the valve spool 132, while the second pressure-control spring 136 is contained in the cylindrical portion 132a. In this manner, both the pressure-control springs 136 and 137 are concentrically arranged. Thus, the first pressure-control spring 137 receives an urging load from the first control lever 138 through a cup-like first slide 140 adapted to be guided in the valve box 131, while the second pressure-control spring 136 receives an urging load from the second control lever 139 through a second slide 141 adapted to be guided in the cylindrical portion 132a. A portion of the first control lever 138 bearing against the first slide 140 is formed in a bifurcated shape to straddle the cylindrical portion 132a (see FIG. 7).

An input torque sensor 145 for sensing a torque input into the continuously variable transmission CVT is connected to the first control lever 138, and a speed change ratio sensor 146 for sensing a speed change ratio of the continuously variable transmission CVT is connected to the second control lever 139, so that the urging load to the first pressure-control spring 137 may be increased according to an increase in input torque, and the urging load to the second pressure-control spring 136 may be increased according to an increase in speed change ratio.

Accordingly, the valve spool 132 may be moved leftward or rightward depending upon the superiority and inferiority between the leftward control force provided by the urging load applied to the first and second pressure-control springs 137 and 136 and the rightward control force provided by the line pressure introduced through the branched oil passage 127a into the pressure receiving chamber 135, so that the line pressure can be controlled in proportion to the input torque and the speed change ratio.

If the line pressure is controlled in this manner, the transmitted torque to each of the first clutch C1, the drive V-pulley 30 and the driven V-pulley 31 which are operated by the line pressure will be controlled in proportion to the input torque and the speed change ratio. As a result, a highly efficient transmission of power can be achieved, while reducing the burden on the hydraulic pump 126 to a necessary minimum.

With an arrangement of the regulator valve 130 as described above, the single valve spool 132 suffices to deal with two parameters of input torque and speed change ratio, and the simplification of the structure of the hydraulic pressure controller is achieved.

A second working oil passage 150 is connected to the regulator valve 130. The oil passage 150 is adapted to be put out of communication with the working oil passage 127 when the valve spool 132 is located at a limit of leftward movement, and to be put into communication with the working oil passage 127 when the valve spool 132 is even slightly moved rightward. Thus, whenever the hydraulic pump 126 is in operation, the interior of the second working oil passage 150 is maintained at the line pressure.

The second working oil passage 150 is connected to an inlet passage 152 of the torque converter T through an orifice 151 and in turn, an outlet passage 153 of the torque converter T is connected to the oil reservoir 125 through a check valve 154 and an oil cooler 155.

In addition, the output oil passage 161 is connected to the second working oil passage 150 through a modulator valve 160, and to the hydraulic oil chamber 13 in the lockup clutch 12 through an on/off valve 162. Further, the output oil passage 161 is also connected to the first actuating chamber 96 in the hydraulic servo motor 52 and to an inlet 164 of the hydraulic governor 163.

The hydraulic governor 163 is of a known vehicle speed-responsive type rotatably driven by the output shaft 15 and is adapted to produce a hydraulic pressure proportional to a vehicle speed at an outlet 165 from the hydraulic pressure introduced into the inlet 164. The outlet 165 is connected to the hydraulic control oil chamber 98 in the servo motor 52. Accordingly, the hydraulic pressure proportional to the vehicle speed will act on the hydraulic control oil chamber 98, as known.

The modulator valve 160 comprises a valve box 167, and a valve spool 168 leftward and rightward slidable within the valve box 167, so that leftward movement of the valve spool 168 causes the second working oil passage 150 and the output oil passage 161 to be brought into communication with each other, and rightward movement of the spool 168 causes them to be put out of communication. Provided within the valve box 167 are a right pressure-receiving chamber 169 and a left pressure-receiving chamber 170 on which right and left ends of the valve spool 168 face respectively. The right pressure-receiving chamber 169 contains a pressure-control spring 171 for biasing the valve spool 168 leftward with a given load and is connected to the outlet 165 of the hydraulic governor 163. The left pressure-receiving chamber 170 is connected to the output oil passage 161. Thus, it is possible for the modulator valve 160 to receive the hydraulic pressure thereinto from the second working oil passage 150 and deliver, to the output oil passage 161, a hydraulic pressure proportional to the vehicle speed, with a hydraulic pressure corresponding to the load of the pressure-control spring being as a minimum value.

The use of the hydraulic pressure controlled in this manner as a working oil for the servo motor 52 need not apply an excessive hydraulic pressure to the servo motor 52 and is extremely effective in smoothly operating the power cylinder 92.

The on/off valve 162 comprises a valve box 173, and a valve spool 174 leftward and rightward slidable within the valve box 173. When the valve spool 174 is in a rightward moved position, i.e., in a closing position, the on/off valve 162 blocks the communication between the output oil passage 161 and the hydraulic oil chamber 13 of the lockup clutch 12, whereas when the valve spool 174 is in a leftward moved position, i.e., in an opening position, the valve 162 permits the communication between the output oil passage 161 and the hydraulic oil chamber 13. In the valve box 173, there are left pressure-receiving chamber 175 and right pressure-receiving chamber 176 on which the left and right ends of the valve spool 174 face respectively. The left pressure-receiving chamber 175 contains a closing spring 177 for biasing the valve spool 174 rightward, and the right pressure-receiving chamber 176 is connected to the outlet 165 of the hydraulic governor 163. Accordingly, the hydraulic pressure proportional to the vehicle speed is also supplied to the right pressure-receiving chamber 176 and hence, when the vehicle speed is lower than a set value, the valve spool 174 remains maintained in the closing position by the closing spring 177, and when the vehicle speed has exceeded the set value, the valve spool 174 is changed over to the opening position by the hydraulic pressure in the right pressure-receiving chamber 176, so that the lockup clutch 12 can be operated by the output hydraulic pressure from the modulator valve 160. Moreover, the output hydraulic pressure from the modulator 160 is proportional to the vehicle speed when the vehicle speed has exceeded the set value, as described above and hence, the engaging force of the lockup clutch 12 will be also controlled in proportion to the vehicle speed, thereby providing the directly coupled state of the torque converter T corresponding to a high speed operation of the vehicle.

Figure 7:
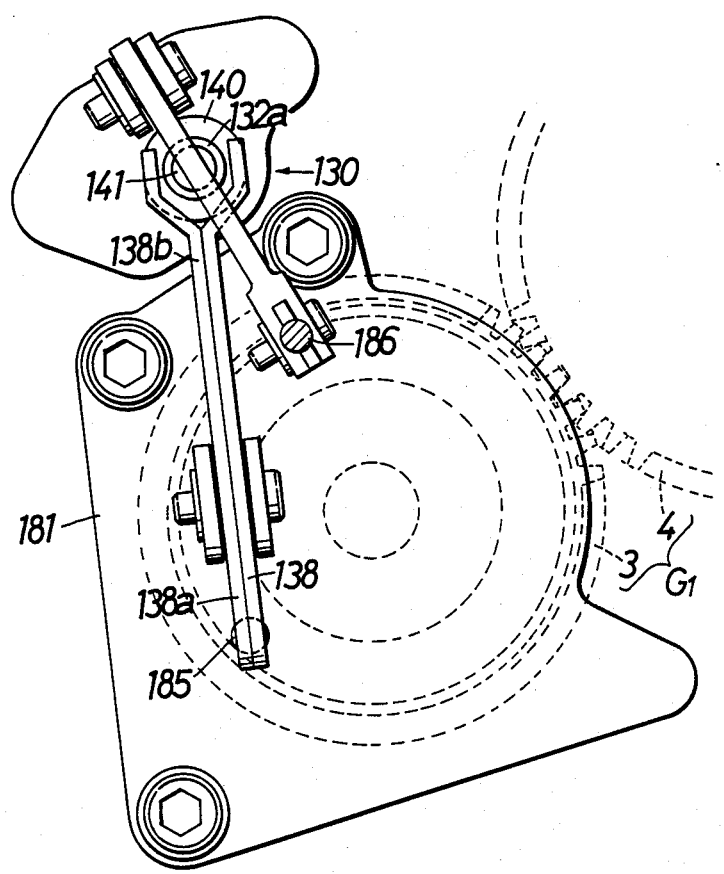
FIG. 7 is a view taken in a direction of an arrow VII—VII of FIG. 6.

The input torque sensor 145 will be described below with reference to FIGS. 2, 6 and 7.

The input torque of the continuously variable transmission CVT is detected as a transmitted torque from the primary reduction gear train G1 and for this purpose, this gear train G1 is constructed in the following manner.

The drive gear 3 is coupled to the turbine shaft 8 through ball keys 180, while the driven gear 4 is supported on the input shaft 14 against axial movement. Both the gears 3 and 4 are formed into a helical type, so that during a forward operation where the former 3 drives the latter 4, a thrust force produced at a meshed portion of the gears 3 and 4 acts on the former 3 as a rightward force as viewed in FIGS. 2 and 6.

On the right of the former, i.e., the drive gear 3, there is disposed a support plate 181 with a central short shaft 181a relatively rotatably fitted in the turbine shaft 8. The support plate 181 is fixed in place on the transmission case 2. Mounted between the support plate 181 and the drive gear 3 are a thrust plate 183 bearing against the right side of the drive gear 3 with a thrust bearing interposed therebetween, and Belleville spring 184 for resiliently biasing the thrust plate 183 toward the drive gear 3. The thrust plate 183 is connected to the first control lever 138 through a push rod 185. The first control lever 138 is comprised of a shorter arm 138a connected with the push rod 185, and a longer arm 138b extending in the opposite direction to the shorter arm 138a and connected to the first slide 140, and is capable of amplifying the movement of the push rod 185 to transmit it to the first slide 140.

Thus, as the transmitted torque from the primary reduction gear train G1, i.e., the input torque of the continuously variable transmission CVT is increased during a forward operation, the thrust force produced at the meshed portion of the drive and driven gears 3 and 4 is also increased with such increase. When the thrust force has exceeded the set load, the drive gear 3 starts to move rightward as viewed in FIG. 6 together with the thrust plate 183, wherein such displacement is proportional to the input torque. That is, the magnitude of the input torque is taken up as an amount that the thrust plate 183 is displaced. Then, the rightward movement of the thrust plate 183 is transmitted from the push rod 185 through the first control lever 138 to the first slide 140 and then to the first pressure-control spring 137 and therefore, the urging load proportional to the input torque is applied to the first pressure-control spring 137. Moreover, the displacement of the thrust plate 183 is amplified by the first control lever 138 and transmitted to the first pressure-control spring 137 and therefore, even with a relative small displacement of the drive gear 3, a sufficient load can be applied to the first pressure-control spring 137.

Figure 4:
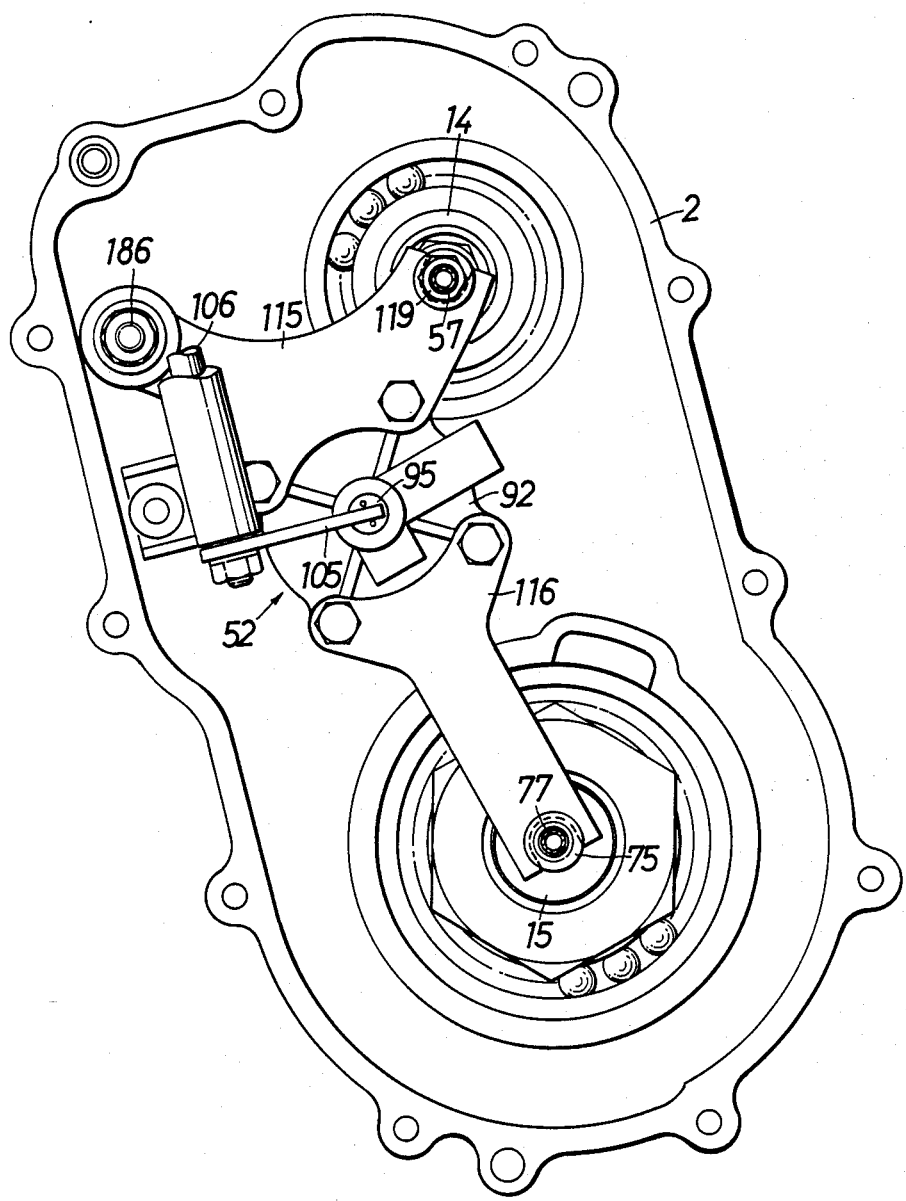
FIG. 4 is a view taken in a direction of an arrow IV—IV of FIG. 3.

Next, the speed change ratio sensor 146 will be described below. As shown in FIGS. 4, 6 and 7, the sensor 146 is comprised of a connecting rod 186 connected at its opposite ends to the first interlocking plate 115 and the second control lever 139. While the second slide 141 bears against a central portion of the second control lever 139, the connecting rod 186 bears against a leading end of the second control lever 139. Accordingly, the displacement of the connecting rod 186 may be reduced by the second control lever 139 and transmitted to the second slide 141.

When the speed change ratio of the continuously variable transmission CVT is increased, the first interlocking plate 115 is moved leftward as viewed in FIG. 3, and when the speed change ratio is decreased, the first interlocking plate 115 is moved rightward, so that the position of the interlocking plate 115 is sensed by the connecting rod 186 as the speed change ratio which is transmitted through the second control lever 139 and the second slide 141 to the second pressure-control spring 136. Therefore, the urging load proportional to the speed change ratio is applied to the second pressure-control spring 136. Moreover, because the movement of the connecting rod 186 is reduced and transmitted to the second spring 136 through the medium of the second control lever 139, an excessive urging load cannot be supplied to the second pressure-control spring 136, even if the displacement of the first interlocking plate 115 is relatively large.

What is claimed is:

1. A belt type continuously variable transmission comprising an input shaft driven from an engine, an output shaft for driving a wheel, a drive V-pulley mounted on said input shaft and variable in effective radius, a driven V-pulley mounted on said output shaft and variable in effective radius, a V-belt stretched around both said pulleys, a hydraulic actuator for changing the effective radius of each of said V-pulleys, a hydraulic pressure controller for controlling the hydraulic pressure supplied to said hydraulic actuator, said controller being provided between said hydraulic actuator and a hydraulic pump driven by the engine to supply a hydraulic pressure to said hydraulic actuator, an input torque sensor for controlling said hydraulic pressure controller in such a manner that the hydraulic pressure supplied to said hydraulic actuator is proportional to the input torque of said input shaft, a speed change ratio sensor for controlling said hydraulic pressure controller in such a manner that the hydraulic pressure supplied to said hydraulic actuator is proportional to the speed change ratio between said input and output shafts, said sensors being connected to said hydraulic pressure controller, wherein said hydraulic pressure controller comprises a regulator valve for permitting and interrupting communication of a working oil passage connecting said hydraulic pump and said hydraulic actuator with a spill oil passage, said regulator valve including a single valve spool and first and second pressure-control springs for biasing said valve spool in a closing direction, said input torque sensor being connected to said first pressure-control spring so as to apply thereto an urging load proportional to said input torque, and said speed change ratio sensor being connected to said second pressure-control spring so as to apply thereto an urging load proportional to said speed change ratio.

2. A belt type continuously variable transmission comprising an input shaft driven from an engine, an output shaft for driving a wheel, a drive V-pulley mounted on said input shaft and variable in effective radius, a driven V-pulley mounted on said output shaft and variable in effective radius, a V-belt stretched around both said pulleys, a hydraulic actuator for changing the effective radius of each of said V-pulleys, a hydraulic pressure controller for controlling the hydraulic pressure supplied to said hydraulic actuator, said controller being provided between said hydraulic actuator and a hydraulic pump driven by the engine to supply a hydraulic pressure to said hydraulic actuator, an input torque sensor for controlling said hydraulic pressure controller in such a manner that the hydraulic pressure supplied to said hydraulic actuator is proportional to the input torque of said input shaft, a speed change ratio sensor for controlling said hydraulic pressure controller in such a manner that the hydraulic pressure supplied to said hydraulic actuator is proportional to the speed change ratio between said input and output shafts, said sensors being connected to said hydraulic pressure controller, wherein said hydraulic actuator includes a hydraulic oil chamber adapted to operate a movable V-pulley half of said driving V-pulley so as to increase the effective radius of said driving V-pulley upon introduction of a hydraulic pressure into said hydraulic oil chamber, said hydraulic oil chamber being connected to said hydraulic pump through a control valve which comprises a main valve member connected to a speed change actuator, and a follower valve member for controlling the introduction of a hydraulic pressure into said hydraulic oil chamber in cooperation with said main valve member to cause the said movable V-pulley half to follow the movement of said main valve member.

3. A belt type continuously variable transmission comprising an input shaft driven from an engine, an output shaft for driving a wheel, a drive V-pulley mounted on said input shaft and variable in effective radius, a driven V-pulley mounted on said output shaft and variable in effective radius, a V-belt stretched around both said pulleys, a hydraulic actuator for changing the effective radius of each of said V-pulleys, a hydraulic pressure controller for controlling the hydraulic pressure supplied to said hydraulic actuator, said controller being provided between said hydraulic actuator and a hydraulic pump driven by the engine to supply a hydraulic pressure to said hydraulic actuator, an input torque sensor for controlling said hydraulic pressure controller in such a manner that the hydraulic pressure supplied to said hydraulic actuator is proportional to the input torque of said input shaft, a speed change ratio sensor for controlling said hydraulic pressure controller in such a manner that the hydraulic pressure supplied to said hydraulic actuator is proportional to the speed change ratio between said input and output shafts, said sensors being connected to said hydraulic pressure controller, wherein said hydraulic actuator includes a hydraulic oil chamber adapted to operate a movable V-pulley half of said driven V-pulley so as to increase the effective radius of said driven V-pulley upon introduction of a hydraulic pressure into said hydraulic oil chamber, said hydraulic oil chamber being connected to said hydraulic pump through a control valve which comprises a main valve member connected to a speed change actuator, and a follower valve member for controlling the introduction of a hydraulic pressure into said hydraulic oil chamber in cooperation with said main valve member to cause the said movable V-pulley half to follow the movement of said main valve member.

4. A belt type continuously variable transmission according to claim 2 or 3, wherein said speed change ratio sensor comprises a rod connected to said second main valve member, so that said speed change ratio is sensed as a displacement of said rod.

5. A belt type continuously variable transmission comprising an input shaft driven from an engine, an output shaft for driving a wheel, a drive V-pulley mounted on said input shaft and variable in effective radius, a driven V-pulley mounted on said output shaft and variable in effective radius, a V-belt stretched around both said pulleys, a hydraulic actuator for changing the effective radius of each of said V-pulleys, a hydraulic pressure controller for controlling the hydraulic pressure supplied to said hydraulic actuator, said controller being provided between said hydraulic actuator and a hydraulic pump driven by the engine to supply a hydraulic pressure to said hydraulic actuator, an input torque sensor for controlling said hydraulic pressure controller in such a manner that the hydraulic pressure supplied to said hydraulic actuator is proportional to the input torque of said input shaft, a speed change ratio sensor for controlling said hydraulic pressure controller in such a manner that the hydraulic pressure supplied to said hydraulic actuator is proportional to the speed change ratio between said input and output shafts, said sensors being connected to said hydraulic pressure controller, wherein said hydraulic actuator includes a first hydraulic oil chamber adapted to operate a movable V-pulley half of said drivin V-pulley so as to increase the effective radius of said drive V-pulley upon introduction of a hydraulic pressure into said first hydraulic oil chamber, and a second hydraulic oil chamber adapted to operate a movable V-pulley half of said driven V-pulley so as to increase the effective radius of said driven V-pulley upon introduction of a hydraulic pressure into said second hydraulic oil chamber, said first hydraulic oil chamber being connected to the hydraulic pump through a first control valve, said second hydraulic oil chamber being connected to the hydraulic pump through a second control valve, said first control valve comprising a first main valve member and a first follower valve member for controlling the introduction of a hydraulic pressure into said first hydraulic oil chamber in cooperation with said first main valve member to cause the movable V-pulley half of said driving V-pulley to follow the movement of said first main valve member, said second control valve comprising a second main valve member and a second follower valve member for controlling the introduction of a hydraulic pressure into said second hydraulic oil chamber in cooperation with said second main valve member to cause the movable V-pulley half of said driven V-pulley to follow the movement of said second main valve member, and said first and second main valve members being operatively connected to a common speed change actuator.

6. A belt type continuously variable transmission according to claim 5, wherein said speed change actuator comprises a hydraulic servo motor which includes a pilot valve operated by a first control force proportional to the vehicle speed and a second control force proportional to the opening degree of a throttle valve of the engine.

7. A belt type continuously variable transmission comprising an input shaft driven from an engine, an output shaft for driving a wheel, a drive V-pulley mounted on said input shaft and variable in effective radius, a driven V-pulley mounted on said output shaft and variable in effective radius, a V-belt stretched around both said pulleys, a hydraulic actuator for changing the effective radius of each of said V-pulleys, a hydraulic pressure controller for controlling the hydraulic pressure supplied to said hydraulic actuator, said controller being provided between said hydraulic actuator and a hydraulic pump driven by the engine to supply a hydraulic pressure to said hydraulic actuator, an input torque sensor for controlling said hydraulic pressure controller in such a manner that the hydraulic pressure suppled to said hydraulic actuator is proportional to the input torque of said input shaft, a speed change ratio sensor for controlling said hydraulic pressure controller in such a manner that the hydraulic pressure supplied to said hydraulic actuator is proportional to the speed change ratio between said input and output shafts, said sensors being connected to said hydraulic pressure controller, wherein said input torque sensor comprises a pair of helical gears disposed between said engine and said input shaft to transmit a power from said engine to said input shaft, at least one of said helical gears being axially movable, a spring for resiliently urging said axially movable gear to a direction counter to a thrust force produced at said axially movable gear during transmission of the power, and sensing means for sensing the axial displacement of said gear, so that said input torque is sensed as the axial displacement of said gear.

8. A belt type continuously variable transmission comprising an input shaft driven from an engine, an output shaft for driving a wheel, a drive V-pulley mounted on said input shaft and variable in effective radius, a driven V-pulley mounted on said output shaft and variable in effective radius, a V-belt stretched around both said pulleys, an actuator for changing the effective radius of at least one of said V-pulleys, a controller for controlling the hydraulic pressure acting on said actuator, and a hydraulic pump for supplying a pressurized fluid to said actuator, wherein said transmission includes an input torque sensor for controlling said controller in such a manner that the hydraulic pressure acting on said actuator is approximately proportional to the input torque of said input shaft, and a speed change ratio sensor for controlling said controller in such a manner that the hydraulic pressure acting on said actuator is approximately proportional to the speed change ratio between said input and output shafts, said sensors being connected to said controller, and wherein said actuator includes means for supplying a pressurized fluid through a control valve means from the hydraulic pump for changing the effective radius of the V-pulley, said control valve means comprising a main valve member movable in response to a speed change operation and a follower valve member for providing cooperation action between the main valve member and said V-pulley.

9. A belt type continuously variable transmission comprising an input shaft driven from an engine, an output shaft, a drive V-pulley mounted on said input shaft, a driven V-pulley mounted on said output shaft, at least one of said V-pulleys being variable in effective radius, a V-belt stretched around both said pulleys, an actuator for changing the effective radius of at least one said V-pulley and varying the tension applied to the V-belt, a controller for controlling the operation of the actuator, an input torque sensor connected to said controller, a speed change ratio sensor connected to said controller, said controller including mechanical means operated in response to said sensors for causing movement of said mechanical means corresponding to a sum of amounts proportional to both the input torque of said input shaft and the speed change ratio between said input and output shafts as sensed by said sensors for varying the effective radius of at least one pulley having a variable effective radius and the tension in the V-belt.

10. A belt type continuously variable transmission comprising an input shaft driven from an engine, an output shaft for driving a wheel, a drive V-pulley mounted on said input shaft and variable in effective radius, a driven V-pulley mounted on said output shaft and variable in effective radius, a V-belt stretched around both said pulleys, an actuator for changing the effective radius of at least one of the V-pulleys through the medium of a pressurized fluid and varying the tension applied to the V-belt, a control system from controlling the operation of the actuator by adjusting the amount of the pressurized fluid supplied to the actuator, an input torque sensor associated with said control system, a speed change ratio sensor associated with said control system, and said control system including mechanical means interposed in a passage connecting a pressurized fluid source and said actuator and operable to perform mechanical movements of an amount corresponding to a sum of the level of an input torque of said input shaft sensed by the input torque sensor and the level of a speed change ratio between the input and output shafts sensed by the speed change ratio sensor, thereby regulating the level of pressure of pressurized fluid to be fed to the actuator through said passage.

11. A belt type continuously variable transmission according to claim 10, wherein said actuator includes a chamber adapted to be expanded and operate a movable V-pulley half of said one V-pulley so as to increase the effective radius of the pulley upon introduction of the pressurized fluid into said chamber.

12. A belt type continuously variable transmission according to claim 10, wherein said actuator serves to change the effective radii of both said V-pulleys and includes chambers which are adapted to be expanded and operate movable V-pulley halves of the respective V-pulleys so as to increase the effective radii thereof upon introduction of the pressurized fluid into the chambers.

13. A belt type continuously variable transmission according to claim 10, 11, or 12, wherein said control system further includes a servo motor which comprises a pilot valve operated by a firs control force approximately proportional to a vehicle speed and a second control force approximately proportional to the opening degree of a throttle valve of the engine.

14. A belt type continuously variable transmission according to claim 10, 11 or 12, wherein said speed change ratio sensor comprises a rod which performs a displacement in response to a change in the level of said speed change ratio.

15. A belt type continuously variable transmission according to claim 10, wherein said mechanical means comprises a regulator valve for permitting and interrupting communication of said passage with a spill passage, said regulator valve including a single valve spool and first and second pressure-control springs for biasing said valve spool in a closing direction, said input torque sensor being connected to said first pressure-control spring so as to apply thereto an urging load approximately proportional to the level of said input torque, and said speed change ratio sensor being connected to said second pressure-control spring so as to apply thereto an urging load approximately proportional to the level of said speed change ratio.

16. A belt type continuously variable transmission according to claim 15, wherein said single valve spool of the regulator valve has first and second abutment surfaces, one of the abutment surfaces concentrically surrounding the other and receiving thereon one of the pressure-control springs, the other abutment surface receiving thereon the other pressure-control spring.

17. A belt type continuously variable transmission according to claim 10, wherein said input torque sensor comprises a pair of helical gears disposed between said engine and said input shaft to transmit a power from said engine to said input shaft, at least one of said helical gears being axially movable, a spring for resiliently urging said axially movable gear in a direction counter to a thrust force produced at said axially movable gear during transmission of the power, and sensing means for sensing the axial displacement of said gear, so that said input torque is sensed as the axial displacement of said gear.

* * * * *